(12) United States Patent
Hintennach et al.

(10) Patent No.: US 6,830,091 B2
(45) Date of Patent: Dec. 14, 2004

(54) LOUVER AND LOUVER CURTAIN CONSTRUCTED THEREFROM

(75) Inventors: Markus Hintennach, Baltmannsweiler (DE); Reno Reppin, Berlin (DE)

(73) Assignee: BOS GmbH & Co. KG, Ostfilden (DE)

( * ) Notice: Subject to any disclaimer, the term of this patent is extended or adjusted under 35 U.S.C. 154(b) by 0 days.

(21) Appl. No.: 10/266,801

(22) Filed: Oct. 8, 2002

(65) Prior Publication Data

US 2003/0085007 A1 May 8, 2003

(30) Foreign Application Priority Data

Oct. 8, 2001 (DE) ......................................... 101 49 449

(51) Int. Cl.[7] .................................................. E06B 9/36
(52) U.S. Cl. .................................. 160/172 V; 160/236
(58) Field of Search ....................... 160/370.21, 370.22, 160/370.23, 107, 172 R, 172 V, 134, 236; 296/95.1, 136.11, 97.4, 97.3, 97.2, 97.11, 97.6, 152; 150/168

(56) References Cited

U.S. PATENT DOCUMENTS

| | | | | |
|---|---|---|---|---|
| 2,234,804 A | * | 3/1941 | Murray | ...................... 160/169 |
| 2,341,233 A | * | 2/1944 | Norton | ........................ 160/236 |
| 3,134,428 A | * | 5/1964 | Kehrer et al. | ............ 160/172 R |
| 3,789,905 A | | 2/1974 | Saito | |
| 4,932,710 A | * | 6/1990 | Chen | ........................ 296/97.3 |
| 4,993,469 A | | 2/1991 | Moench | |
| 5,560,668 A | * | 10/1996 | Li | ............................. 296/97.8 |
| 6,227,601 B1 | * | 5/2001 | LaFrance | ................... 296/97.4 |

FOREIGN PATENT DOCUMENTS

| | | |
|---|---|---|
| DE | 35 05 143 A1 | 8/1986 |
| WO | WO 00/63517 | 10/2000 |

* cited by examiner

Primary Examiner—Blair M. Johnson
(74) Attorney, Agent, or Firm—Leydig, Voit & Mayer, Ltd.

(57) ABSTRACT

A louver for a louver blind curtain comprising two parts which can be moved in a telescope-like manner with respect to each other. By means of a rubber traction device, the louver parts are subjected to pre-tension in the direction toward the shortened position of the louver. The louver curtain comprises a multitude of louvers whose length can be automatically changed and which are guided at both ends on guide tracks. The connection between the louver and each guide track is achieved by a respective slider, where the slider is provided at one end of the louvers with a drive, to change the angular position of the louvers. In addition, those sliders which travel the longest distance during the opening and the closing of the curtain are provided with screwed spindle drives.

44 Claims, 9 Drawing Sheets

LOUVER AND LOUVER CURTAIN CONSTRUCTED THEREFROM

FIELD OF THE INVENTION

The present invention relates generally to curtains for motor vehicle windows, and more particularly, to louver blind type curtains.

BACKGROUND OF THE INVENTION

DE 35 05 143 describes a gathered curtain for motor vehicle windows which are non-rectangular in shape. The arrangement includes two guide tracks which run along long edges of the window and whose separation changes toward one end of the window. In each of the guide tracks, sliders run which are connected with the curtain.

The curtain is sized in such manner that it covers the window in the stretched out form. Consequently, when the curtain is gathered, those parts of the curtain which cover the broader part of the window are too long. The result is an aesthetically unpleasing sack-like appearance when the curtain is in the gathered condition.

WO 00/63517 describes a louver blind type curtain for windows in buildings. The louvers of the blind are suspended on sliders which run in a top guide track. From there, the louvers hang freely downward. At their lower edge, they are connected to each other by means of bead chains to achieve a certain stabilization. Each slider contains an angular gearing by means of which the angular position of the louvers with respect to the plane of the window can be changed to regulate the entry of light.

In addition to this adjustable rotative positioning, the louvers also can be moved in the longitudinal direction. For this purpose, the sliders contain cord rolls on which the pull cords can be wound and which pass through the rotation axis on which the louvers are suspended.

Based on the above, the problem to which the present invention is directed is to provide a louver blind type curtain which is suitable for use in the windows of motor vehicles where the shape of the window differs from that of a simple rectangular shape.

OBJECTS AND SUMMARY OF THE INVENTION

It is an object of the present invention to provide a louver blind type curtain adapted for effective use in non-rectangular-shaped motor vehicles. A related object is to provide a novel louver which accommodates the change in required louver length upon opening and closing of the blind.

In carrying out the invention, a louver is provided which consists of two louver parts, which can be adjusted with respect to each other in a longitudinal direction. One front end of each louver part or section forms the top end of the louver. By means of a pre-tension device, the louver parts are subjected to a pre-tension with respect to each other. The pre-tension device prevents clattering of the parts from knocking against each other as they move in the guide tracks. Without such a pre-tension force, the louvers would have a tendency to clatter against themselves and in their guide tracks when the vehicle is in use.

Louvers which are used in vehicles must have a certain stiffness so that they do not oscillate as a result of vibrations of the vehicle. It is advantageous in that context that at least one louver part has an I-shaped profile in at least a section of its length.

To attach the louver in the vehicle, one end is provided with a connection device. The connection device can have catch members so that louvers can easily be replaced in case of damage. In addition, a catch device facilitates assembly of the louver during the installation of the louver curtain or blinds.

If the second louver part is constructed in the shape of a tube in a manner such that the two louver parts can be shifted in each other in the manner of a telescope, the louver can have an attractive external appearance. In this instance, the installation of the louver is advantageously carried out such that the opening of the outer overlapping louver part is directed downward. Hence, no parts can fall in the slit between the two louver parts.

In order to achieve harmonious cooperation between the louvers and the window contour, at least one end of the louver can be adapted to conform with the course of the window edge at each position assumed by the louver when the louver curtain or blinds are closed.

A versatile shape is achieved if the louver is curved in the shape of a semicircle at one end, as viewed from its flat side. The semicircular shape has advantages, particularly when the lamellar curtain or blinds are open because the upper edge which projects into louver interior of the car is pleasantly rounded.

The pre-tension device is advantageously housed in the interior of the louver so it is not visible. A hollow space suitable for this purpose is, for example, the tube-like shape of the second louver part. The hollow space is closed by a cover so that the mounting of the pre-tension device is facilitated. The location of the cover in the hollow space is sufficiently short to prevent excess expansion of the pre-tension device. Moreover, the cover for closing the hollow space can be a closing cover to which the tube-shaped louver part is connected at one end.

An abutment device for the pre-tension device is advantageously provided on the cover. It consists, in the simplest case, of a pin. A similar abutment device can be formed inside at the end of the other louver part.

The pre-tension device preferably applies tension to the louver in the direction that shortens the longitudinal length of the louver. This prevents the louver from falling apart prior to assembly into the blind. It also is easier to handle it prior to the assembly. A compression member could also be used. In addition, one can use a simple rubber ring if the louver is subjected to pre-tension by pulling in the direction that shortens the longitudinal length.

One of the attachment devices for the louver in the assembled condition consists of a keyhole-type opening. As a result, the assembly and disassembly of the louver may be very simple. In this case, the keyhole-shaped opening can be provided with a recess so that a catch engagement results in cooperation with the pre-tension device.

The louver part advantageously consists of a plastic, for example, a thermoplastic.

The louver curtain according to the invention has two guide tracks which run side by side, following the opposite contours of each given window edge. In this manner, each louver is restrictively guided in a path at both front ends. It is effectively prevented from undergoing a pendulum-type motion as a result of centrifugal forces or other acceleration forces. In addition, the louvers cannot bump into each other. The louvers which are guided in the guide tracks further are adjustable in length according to the window contour.

To open the louver curtain, a coupling device is provided which connects each louver to the neighboring louvers. In this manner, only the louver which travels the longest distance during opening or closing needs to be driven. The louvers which are not driven are entrained via the coupling device during the closing, and, during the opening, they are entrained by the associated neighboring louver which is already in motion.

In each guide track, each louver preferably has its own slider with a peg extending out of the guide track to which the louver is anchored. If the peg can be separated from the louver, the sliders can each be mounted separately and inserted at the time of the mounting.

Since an advantage of louver curtains is that the louvers can be swiveled to regulate the inlet of light, it is advantageous for one of the pegs, and in particular only one of the pegs, to be connected to a given louver in a manner which prevents rotation. Such a connection which prevents rotation makes it possible for the peg to be in the shape of a hammer head that engages in a corresponding opening of the louver. The other peg, in contrast, is symmetrical with respect to rotation. The louver can turn on the peg. In this manner it is unnecessary to synchronize rotation of the pegs at both ends of a louver.

In order to move the slider which has traveled the largest stroke distance during the opening or closing, the slider can be provided with a threaded bore through which a screw spindle is provided. Such an arrangement is very space saving.

Rotation of the pegs can be effected in a simple manner with a small angular gearing which is housed in the interior of the slider. The angular gearing is advantageously a worm drive, where the worm wheel has a opening with polygonal profile. Using a corresponding polygonal cross section shaft, which runs through all the worms, the louvers can be adjusted in synchronism.

The coupling device, whose purpose is to entrain the louvers which are not driven during the opening, is a perforated band in the simplest case. The separation between the holes corresponds to the separation between the louvers in the open state. With the aid of this band it is possible to simultaneously cover the lower guide track, and thus there is no risk of a foreign matter falling in the guide track and interfering with the operation of the louver curtain or blinds.

Advantageously, the band which is used as a coupling device is longer than the curtain and when the louver curtain or blinds are open, covers the guide groove in the guide track. When not in use, the excess part of the band can be wound on a winding shaft by means of a spring drive.

Other objects and advantages of the invention will become apparent upon reading the following detailed description and upon reference to the drawings, in which:

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Figure 1:
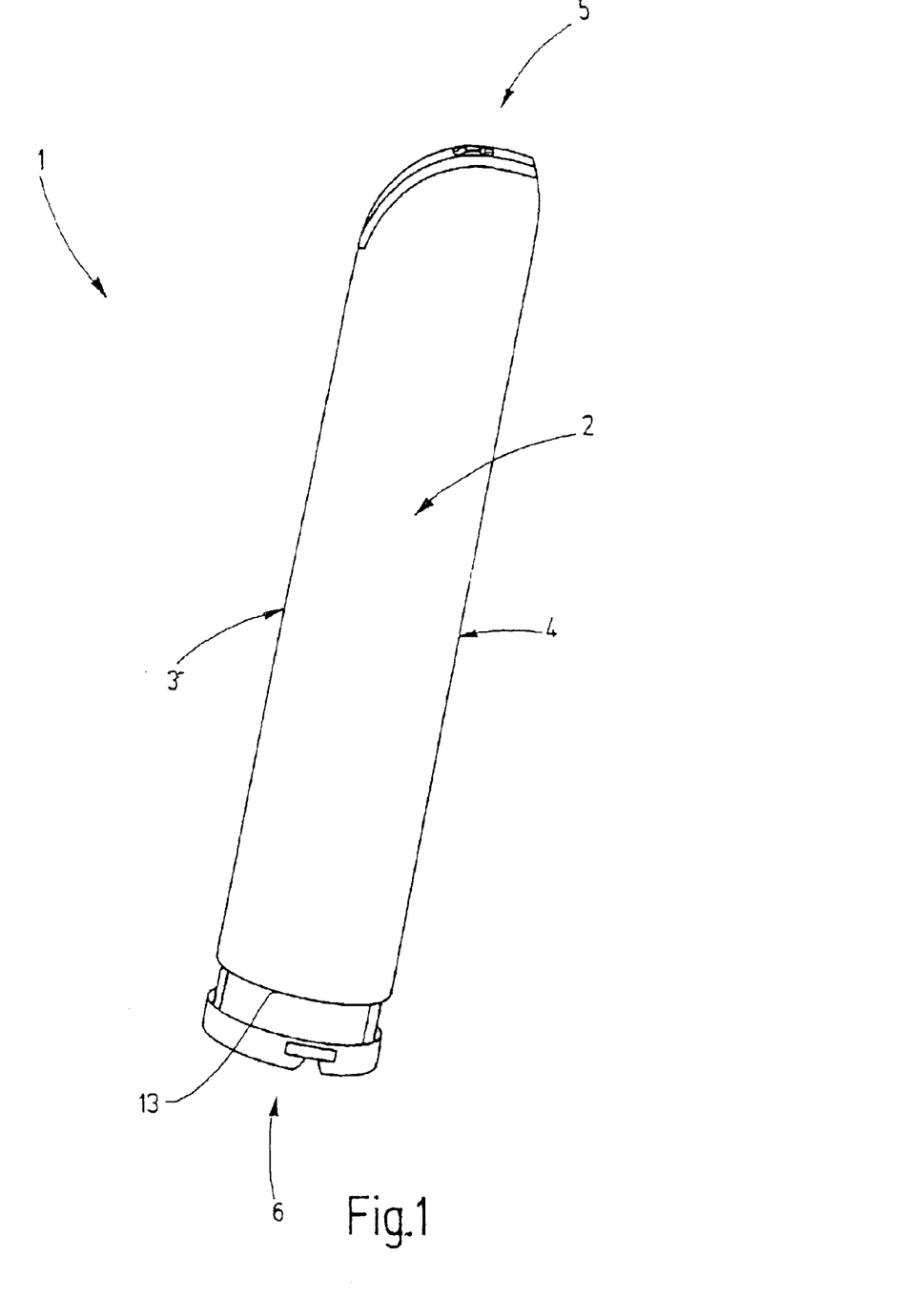
FIG. 1 is a perspective of a louver for a louver type blind or curtain in accordance with the invention.

Referring now more particularly to FIG. 1 of the drawings, there is shown an illustrative louver in accordance with the invention for use in a louver blind type curtain. The louver 1 in this case has opposite flat sides 2 which have a substantially longitudinal rectangular shape defined by opposite straight edges 3, 4. The top end or side of the louver 1 curves from the straight side 3 upwardly into adjoining right angle relation with the straight side 4 and the bottom end or side 6 extends transversely with respect to the straight edges 3, 4, as viewed from the side of the louver in FIG. 1.

In accordance with the invention, the louver is extensible and retractable to accommodate variations in the size of the window with which the louver blind type curtain is used. To this end, the louver 1 has a two-part construction which comprises a lower louver part 7 and an upper louver part 8. The upper louver part 8 is tube-shaped for telescopically receiving the lower louver part 7. The upper louver part 8 has a uniform cross section and is open at both ends. The external contour of the cross section has a shape which defines flat sides 9 and longitudinal edges 11 and 12 which substantially define the outer perimeter of the louver when in a retracted position as shown in FIG. 1. The upper louver part has a lower edge 13 which forms a right angle with respect to the longitudinal edges 11 and 12, while the upper end has an edge 14 represented by a curved or quarter circle-shape form when viewed from the side.

The lower louver part includes a longitudinally extending rectangular plate 15 which is reinforced at opposite marginal edges by flanges 16, 17 so that the louver part 17 has an I-shaped cross-sectional profile. The lower end of the rectangular plate is fitted within a bottom plate 18 which is formed with a T-shaped groove, which opens only to one side 2 of the louver, namely the front side as shown in FIG. 1. The other side of the T-shaped groove is closed. The groove has a downwardly opening slit 21.

The interior of the upper louver part 8 serves as a guide for the flanges 16, 17 of the lower louver part 7. The rectangular plate 15, together with the flanges 16, 17 of the lower louver part 7 are dimensioned such that the lower louver part can be shifted longitudinally within the upper louver part 8, with little clearance, without jamming during movement. The upper end of the plate 15 has two laterally spaced upward projections 22 which have aligned openings through which a pin 23 is positionable.

In carrying out the invention, to pre-tension the upper and lower louver part 7, 8 for the retracted or the shortened position of the louver, a pre-tension device in the form of a rubber ring 24 is provided. One end of the rubber ring surrounds the transverse pin 23 of the lower louver part 8 and the other end of the rubber ring 24 is anchored to a cover 25 which is attached to the upper end 14 of the upper louver part 7. The cover 25 in this case has a curve or ridge 26 and a depending central flange 27. In mounted condition, the ridge 26 rests on the upper end 14 of the upper louver part 8, as can be seen in FIG. 1, while the flange 27 centers and fixes the cover 25 within the upper louver part 8. The flange 27 has a downwardly opening recess 28 across which a counter pin 29 is mounted which serves as a second anchoring place for the rubber ring 24.

The ridge 26 in this instance also is formed with a pocket-shaped recess in its top side, which is accessible from outside the louver through a keyhole-shaped opening 31. The keyhole-shaped opening 31 is longitudinally aligned with the slit 21 of the T-shaped groove 19, or in other words, a line extending through the keyhole-shaped opening 31 and the slit 21 is parallel to the longitudinal axis of the louver. Except for the pins 23, 29, the louver 1 preferably is made entirely of plastic.

The mounting of louver 1 is substantially as follows.

The O ring 24 is threaded onto the partially inserted pin 23. The pin 23 is then advanced until it is anchored in both projections 22 by friction in a manner so that it cannot be moved. The lower louver part 7 which has been prepared in this manner is inserted with the rubber ring 24, from the front end 13, into the upper louver part 8. Using an appropriate tool, the rubber ring 24 is held and pulled out over the front end 14. The rubber ring can now be anchored in a similar manner on the pin 29. The cover 25 is then inserted, with its flange in correct position, into the front end 14 of the upper louver part 8. The assembly is then completed.

It can be seen that the two louver parts 7 and 8 can be pulled apart in the manner of a telescope against the action of the rubber ring 24, the rubber ring 24 pre-tensioning the two louver parts 7 and 8 into the short position of the louver 1 shown in FIG. 1.

In the shortened condition, the longitudinal edges 3 and 4 of the louver 1 are formed by the longitudinal edges 11 and 12 of the upper louver part 8, while the flat side 9 represents the flat side 2 of the louver 1. In the more or less pulled out state, the flat side 2 of the louver 1 is formed moreover, from the flat side of the plate 15, which protrudes from the lower end 13, and from the lateral flanges 16,17. The latter also form sections of the longitudinal edges 3 and 4 of the louver 1 below the upper louver part 8. The length of the plate 15, in the longitudinal direction of louver 1, has dimensions such that, even with the longest pulled out position which occurs during operation, a jam-free telescope-like guiding in the upper louver part 8 is still ensured.

Figure 2:
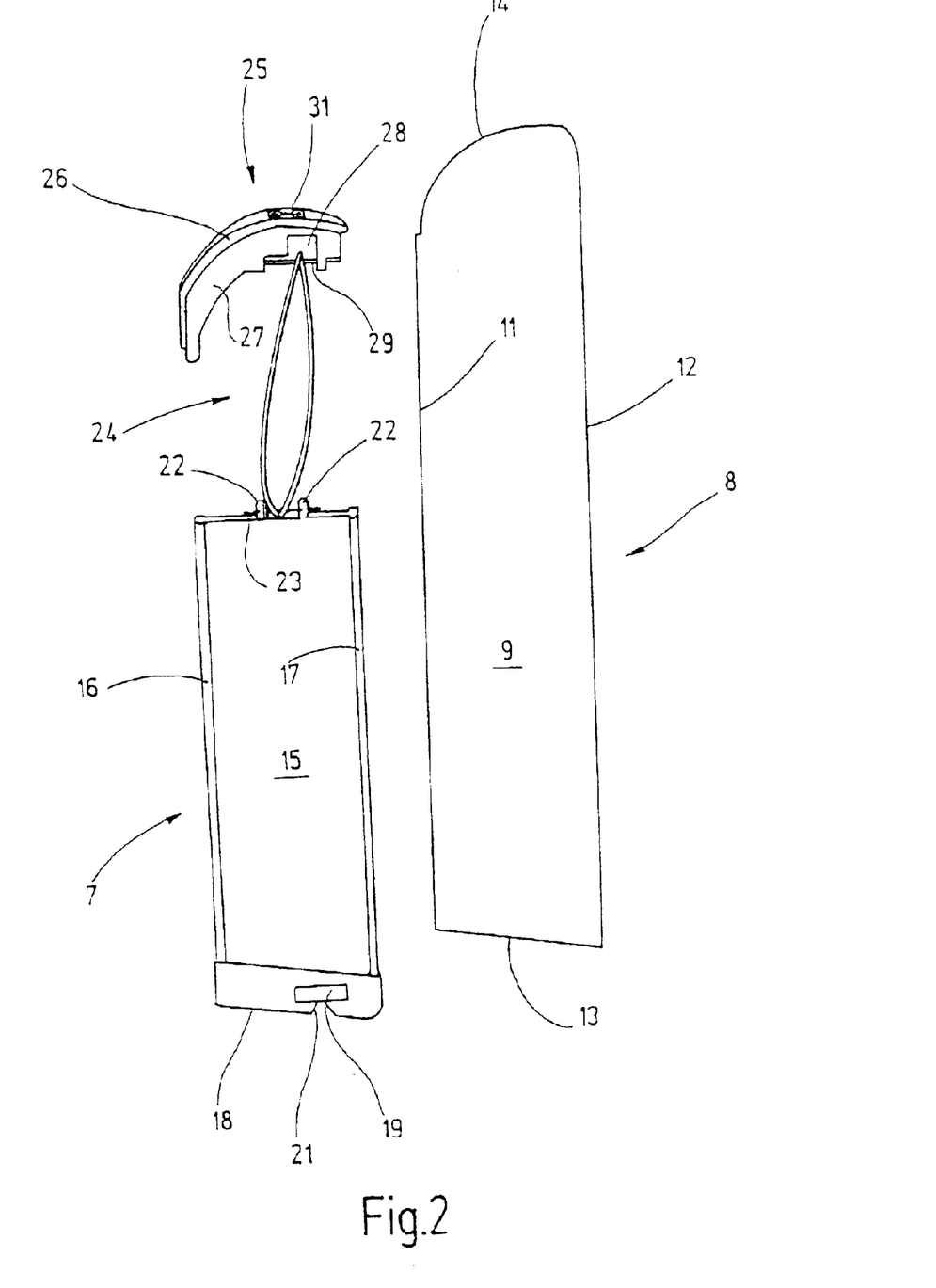
FIG. 2 is a view showing the parts of the louver illustrated in FIG. 1 in removed relation to each other.
Figure 3:
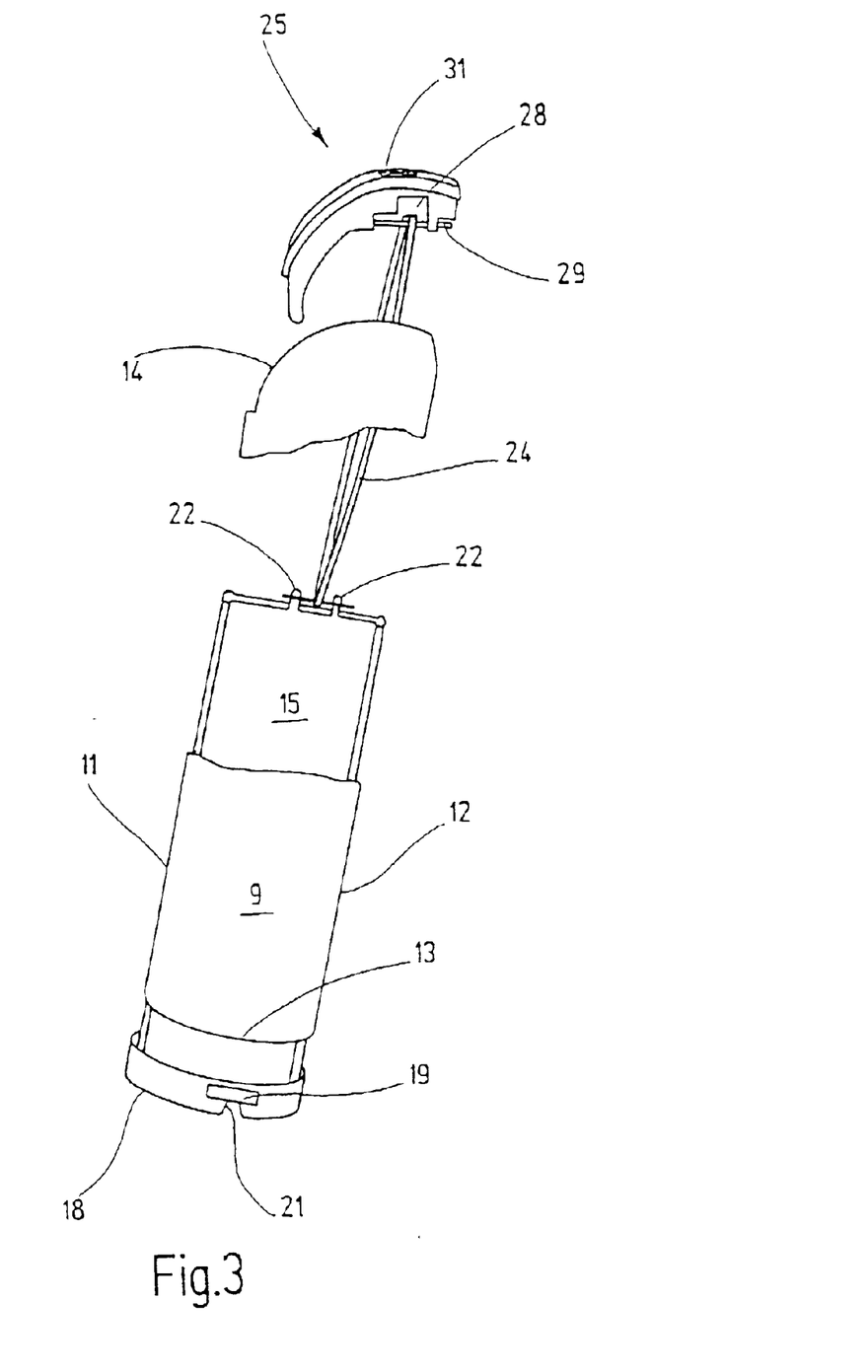
FIG. 3 is a perspective of the louver shown in FIG. 1, partially cut-out, with a cover lifted.
Figure 4:
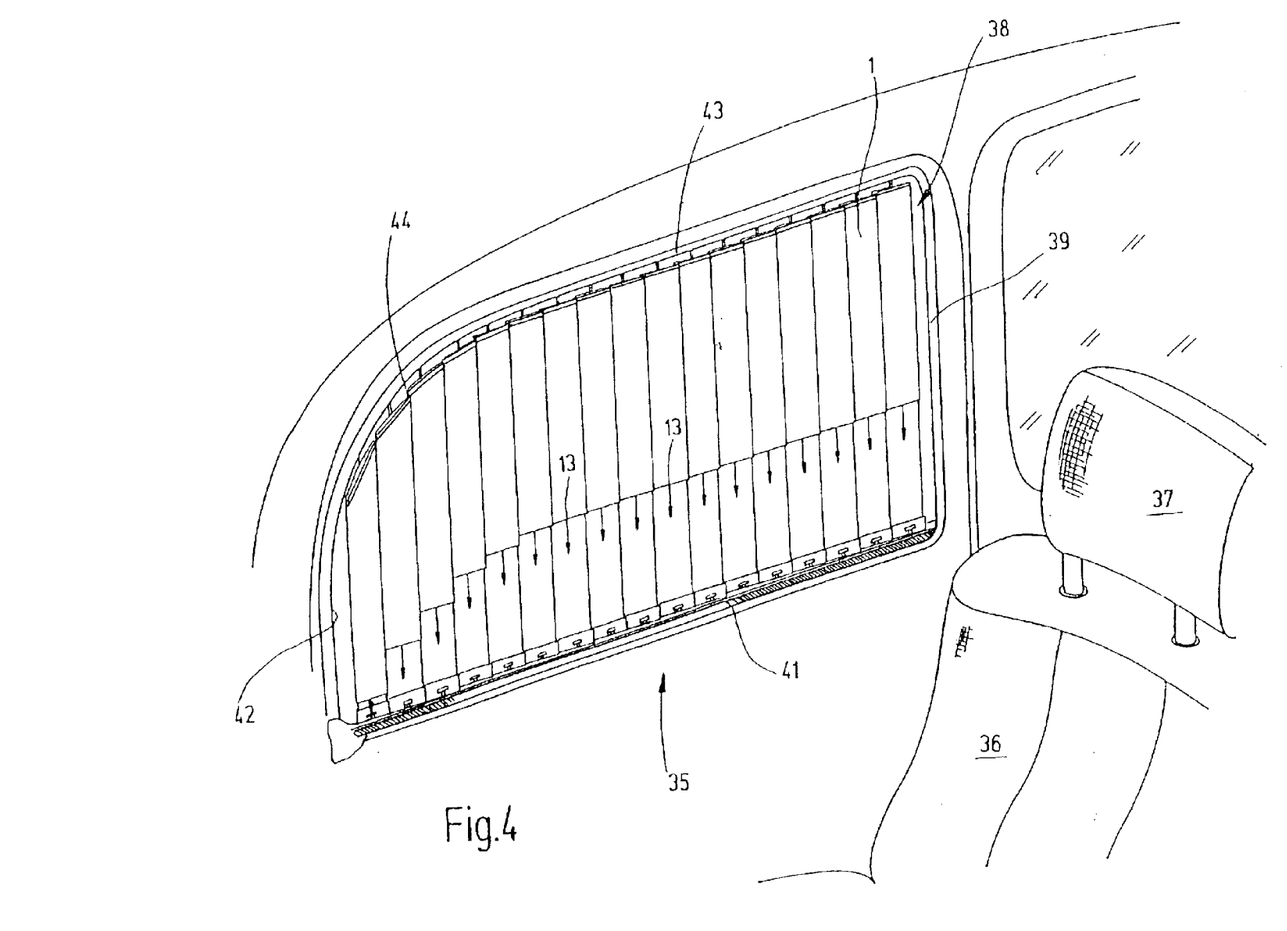
FIG. 4 is a perspective, from the interior of a motor vehicle window with a louver blind or curtain in accordance with the invention shown in a closed condition.
Figure 5:
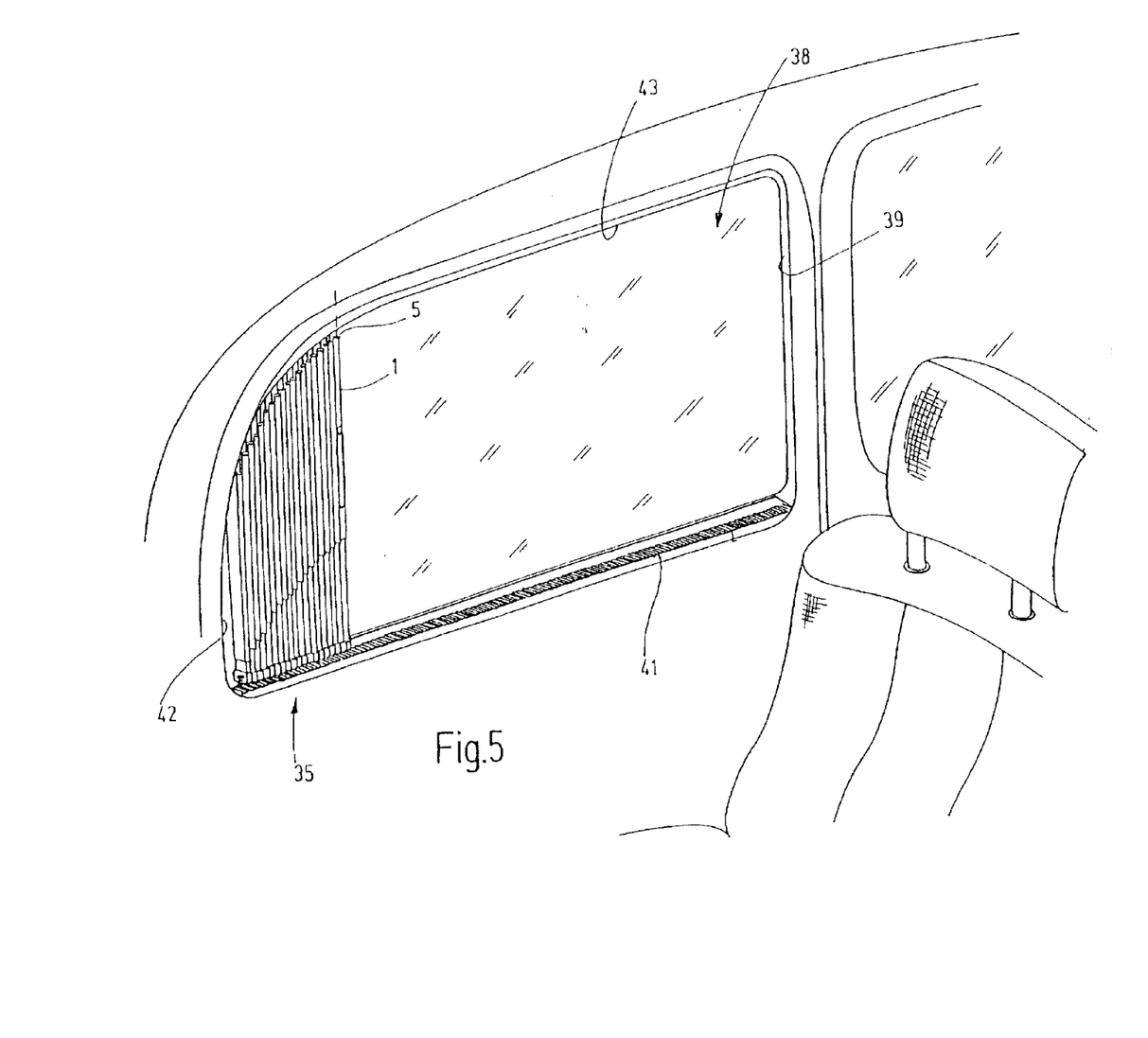
FIG. 5 is a perspective of the vehicle window, similar to FIG. 4, with the louver curtain in a opened position.

By means of the louver shown in FIGS. 1–3, a louver curtain 35 can be constructed, as schematically shown in FIGS. 4 and 5, in closed and opened conditions, respectively. As depicted in FIGS. 4 and 5, the interior of the passenger car has a seat 36 with headrest 37 attached to it. The back of the seat 36 is located next to a side window 38 having a shape which deviates from a rectangular shape. The side window 38 is delimited by a back edge 39, a straight lower edge 41, a curved front edge 42 and an upper edge 43 which undergoes a transition to an arched portion 44. The two edges 41 and 43 need not run parallel to each other.

In the closed condition of the louver curtain 35, the louvers 1 are in a position such that they cover each other over a certain distance at the longitudinal edges 3 and 4 so that the entire window 38 is substantially covered. Their flat sides 2 point towards the interior of the vehicle at all places. Depending on the distance from the upper edge 43 to the lower edge 41, each louver 1 is pulled apart to a varying degree, as can be seen in the position of the lower front side 13. The upper front side 14 and the cover 25 are approximately adapted to the course of the upper window edge 43 at the particular place where the louver 1 is located when the curtain 35 is closed. However, it is also conceivable to design all louvers identically, namely with an upper front side as shown in FIG. 1.

In the open condition, as schematically depicted in FIG. 5, the louvers 1 overlap each other by their flat sides 2 which are located next to each other, and accordingly they are pushed together to form a package.

Figure 6:
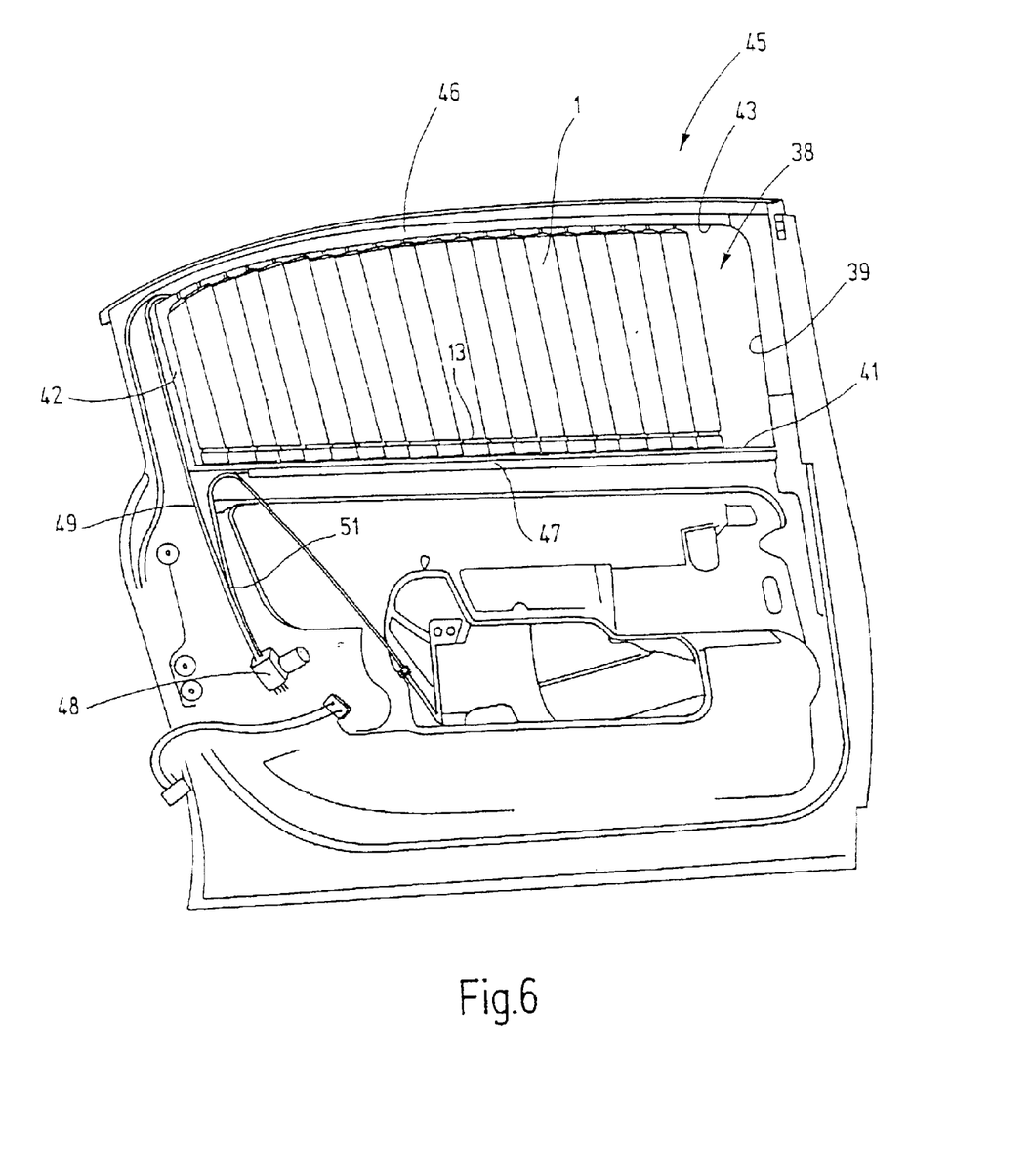
FIG. 6 is a side elevational view of the door of the vehicle provided with the louver curtain, with the internal casing of the door removed.

The manner in which the louvers 1 are held, guided and moved is depicted in FIGS. 6–9. FIG. 6 shows an example of the use of the louver blind or curtain 35 on the door 45 of a large limousine. The door 45 contains a window 38 as described above, which is delimited by the window edges 39, 41, 42 and 44. The window edge 42 in this instance is diagonal with respect to the window edge 39, while the upper window edge 43 in the area which is adjacent to the window edge 42 has a relatively larger curvature. Adjoining the upper and the lower window edge 41, 43, respectively, guide tracks 46, 47 are provided between which movement of the louvers 1 are guided. A drive device 48 mounted on the interior of the door 45 is connected via guide tubes 49, 51 to the guide tracks 46, 47. In the guide tubes 49 and 51, bendable shafts are led, as will be further explained below.

Figure 7:
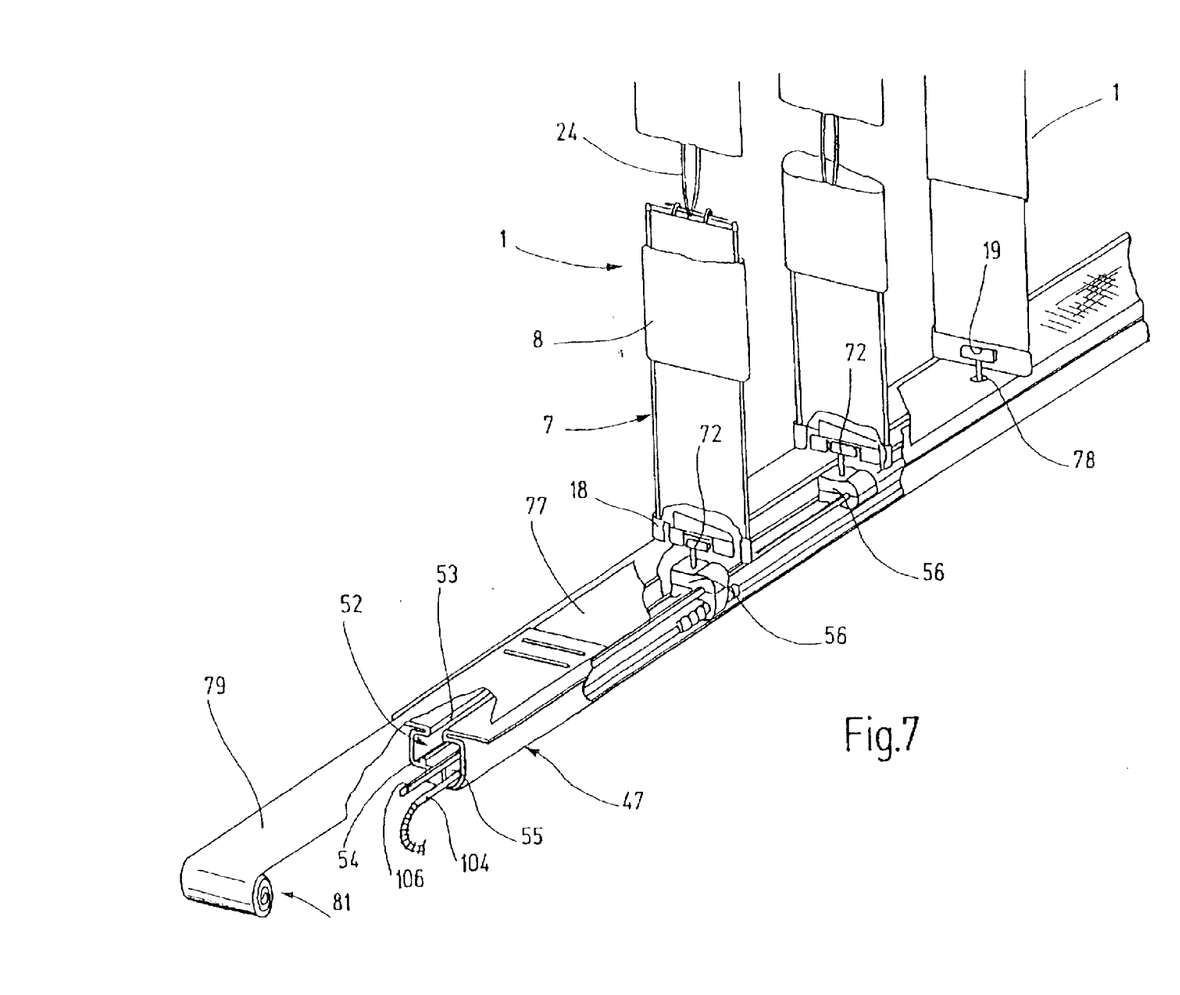
FIG. 7 is a partially diagrammatic perspective of the lower guide track of the illustrated louver curtain.

FIG. 7 shows a perspective view of the lower guide track 47 in relation to with some of the louvers 1. The guide track 47 consists, for example, of a metal sheet part and it presents a T-groove shaped channel 52 which runs along the entire longitudinal direction and which opens upward at a slit 53. The slit 53 has, as is conventional with T-grooves, a smaller width than the part located below it. Opposite the slit 53, the channel is delimited by a floor 54, which may have a guide ridge and which has a groove 55 adjacent a side which runs the entire length of the channel 52, as shown. In the interior of the channel 52, several sliders 56 run, namely one slider 56 is provided per louver 1.

Figure 8:
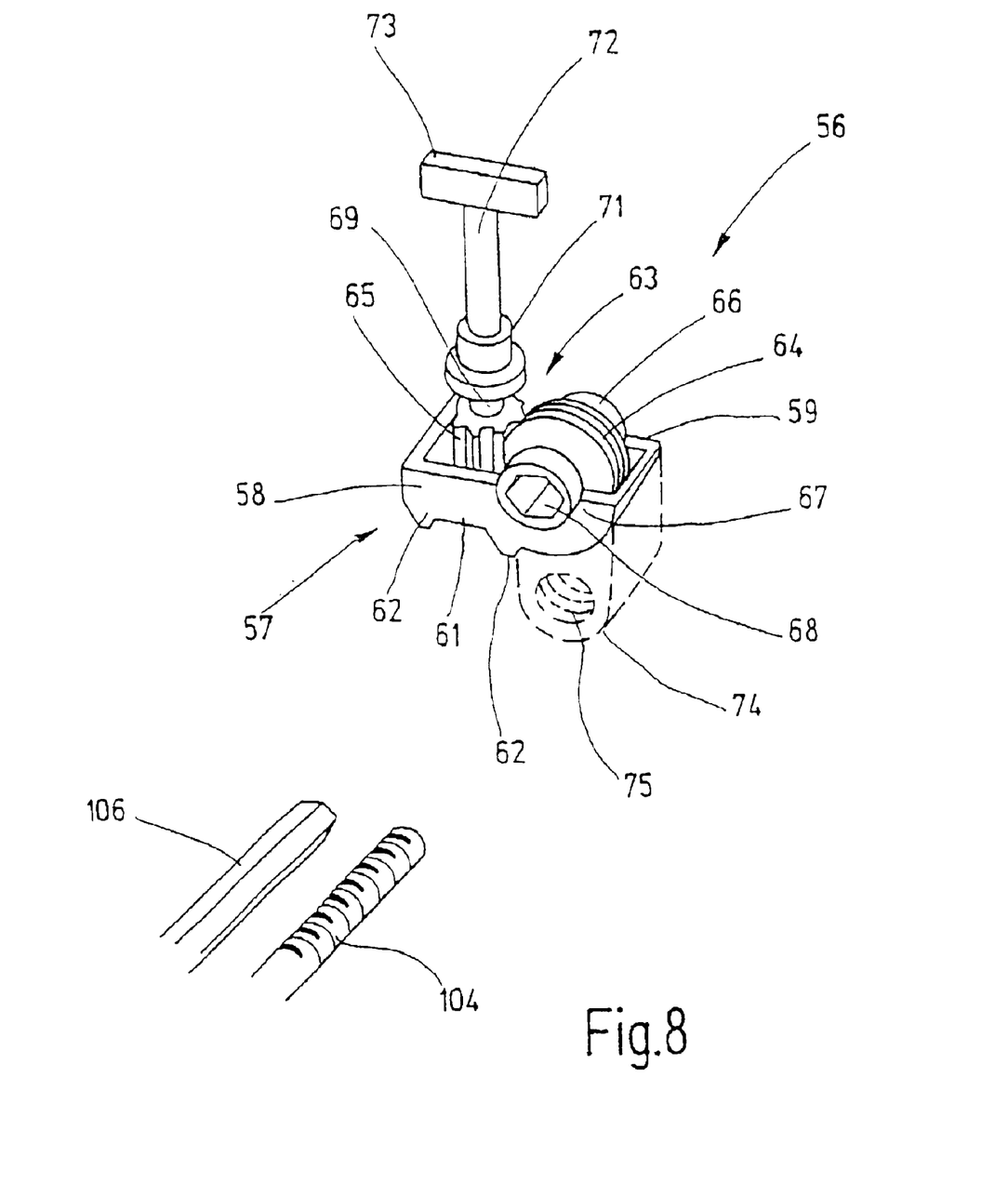
FIG. 8 is an exploded perspective of one of the sliders of the illustrated louver curtain with its associated angular gearing.

FIG. 8 depicts a perspective view of one of the sliders 56. As can be seen, the slider 56 has a drive housing, whose lower housing half 57 can be seen in FIG. 8. The upper housing half is not represented to allow for viewing of the interior. It will be understood to be the mirror image of the housing half 57.

The slider 56 has two sidewalls 58, 59 which are parallel to each other, and which form a right angle with respect to the longitudinal length of the channel 52. In addition, the housing halves 57 present a bottom side 61 from which ribs 62 protrude by means of which the slider 56 runs on the floor 54. The ribs 62 of the sliders can simultaneously serve as an axis-parallel guide by cooperating with corresponding ribs on the floor 54.

An angular gearing 63 is located in the interior of the slider 56, and it consists of a worm 64 and a worm wheel 65. On both of its sides, the worm 64 has cylindrical projections 66, by means of which it is attached, in borings 67 which are aligned with respect to one another in the housing side 58 and the housing side 59, in a manner so it can be rotated. In addition, the worm 64 has an opening 68 with a hexagonal profile which is coaxial with respect to the worm axis. The worm wheel 65 is attached at a right angle to the rotation axis of the worm 64 in appropriate bores of the housing which are located, on the one hand in the floor 61, and, on the other hand in an upper wall of the slider 56. This upper wall, which is not shown in FIG. 8, is part of the upper housing half which can only be seen in FIG. 7. A shaft 69 is rotatably attached to the worm wheel 65, by means of a hammer-shaped entrainer shaft 72 with a cross head 73 that is rotatably connected via a sleeve 71. The shaft 72 ensures the rotatable coupling of the worm wheel 65 to the associated louver 1. For this purpose, the cross head 73 is inserted into the T-shaped opening 19, where it is catch engaged in appropriate catch noses which are not shown in detail.

In the mounted condition, the sliders 56, as seen in FIG. 7, are closed on practically all the sides and only the shaft 69 extends upward out of the housing through the slit 53. Only one of the sliders 56 is provided at its lower housing half 57 with a projection 74 which extends downward as depicted in broken lines in FIG. 8. The projection 74 runs in the groove 55 when the slider 56 is assembled. It has a threaded bore 75 parallel to the axis of the worm 64.

On the top side of the guide track 47, a cover band 77 is provided, which has holes 78 at intervals. The shafts 72 in each case pass through a respective hole 78 with one hole 78 being provided per louver 1. The separation between adjacent holes 78 corresponds to the separations between the louvers 1 when the curtain is closed.

Toward the side to which the leading louver 1 moves during closing, the band 77 is extended in its length by an additional band 79 which can be wound up if needed, as schematically indicated for 81. The band 77 serves both as a cover band for the slit 53 to prevent the entry of foreign matter into the channel 52 and as coupling means to transfer motion of the leading louver 1, which has traveled the largest distance during opening and closing, to the other louvers, when the louver curtain 35 is closed, that is when it is brought into the position according to that depicted in FIGS. 6 and 4.

Figure 9:
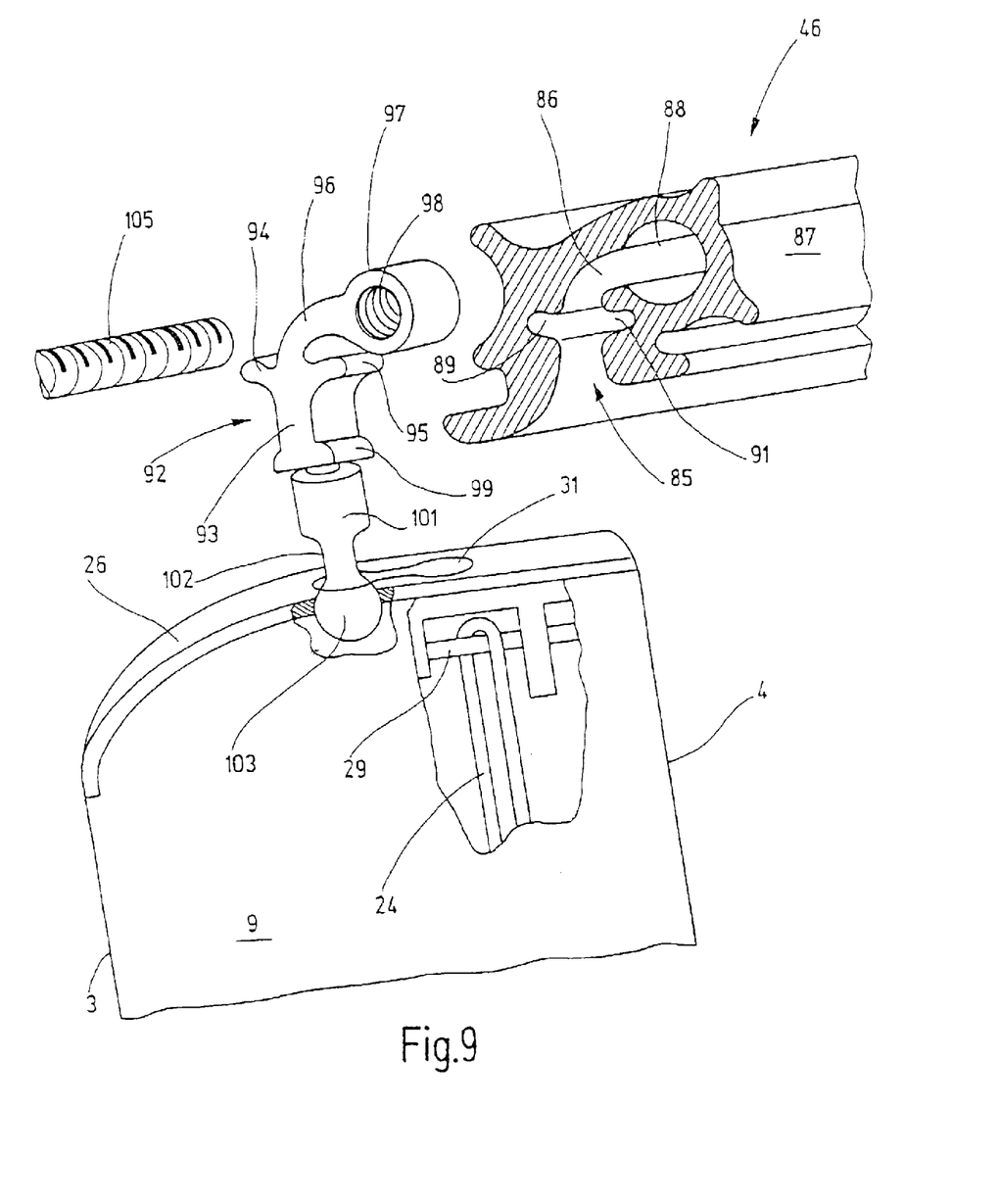
FIG. 9 is an exploded, partially diagrammatic perspective of the upper end of one of the louvers with its associated slider.

The upper guide track 46, depicted in FIG. 9 has a downwardly opening guide groove 85 with sides that are at first approximately parallel. The guide groove bends at 86 around toward a narrow side 87 of the guide track and it opens to a cylindrical section 88. The cylindrical section 88 is located on the side, with reference to a vertical plane which passes through the straight downwardly opening groove part. Thus it is shifted in the direction toward the narrow side 87.

Between the opening of the groove 85, which is directed downwardly and the bend 86, the groove 85 contains two lateral smaller grooves 89 and 91, which protrude at approximately a right angle with reference to the cross-sectional profile of the groove 85. In the groove 85, sliders run, and in FIG. 9, a slider 92 is depicted which is coupled to the louver 1 which travels the largest distance during opening and closing.

The slider 92 has a plate-shaped neck part 93 which is separated at its upper end in the manner of a tulip into two lateral arms 94, 95. The arms 94, 95 run in the grooves 89, 91, while the neck part 93 passes through the groove 85 below these two grooves 89, 91. In an extension of the neck part 93, the slider 92 undergoes a transition to an arc 96 which carries a cylindrical head 97 at a free end formed with a threaded bore 98.

As can be seen in FIG. 9, the arc 96 runs in the guide track 46 in the arc-shaped section 96 of the groove 85, while the cylindrical head 97 runs in the cylindrical section 88. The axis of the threaded bore 98 is parallel to the longitudinal axis of the groove 87.

At the lower end, the neck part 93 is formed with a termination plate 99 to which a peg 101 is molded, which extends the neck part 93 downwardly in a straight direction. The peg 101 is narrowed at 102 and has a spherical head 103 at its lower end. The spherical head 103 is formed with dimensioned for insertion into the larger part of the keyhole-shaped opening 31 where it can then be moved to the side. The other end of the keyhole-shaped opening 31 is formed on a bottom or back side with a funnel-shaped recess into which the spherical head 103 can be engaged. Because of the longitudinal pre-tension in the louver 1, the head 103 remains engaged in the recess.

Only the slider 92 of the louver which is driven during opening and closing of the curtain is provided with the arc 96 and the cylindrical head 97. This part is unnecessary in the other sliders. Nevertheless, to transfer movement to the other sliders, a coupling band is provided, which corresponds to the coupling band 77 and extends over the cylindrical pegs 101.

To drive the louver 1, for opening and closing, a threaded spindle 104 runs through the groove 55 which is connected by the guide tube 49 to the drive 48. The threaded spindle 104 leads through the threaded bore 75 of the bottom of the only slider 56 having such bore. The upper end of the louver 1 is also driven, and a threaded spindle 105 is provided for that purpose. The threaded spindle 105 is located in the cylindrical section 88 of the groove 85 and is screwed through the threaded bore 98 of the slider 92. The threaded spindle 105 may also be sufficiently flexible to extend directly by the guide tube 51 to the drive motor 48, or it may undergo a transition at a suitable place into a bendable shaft so that it can be rotatably driven by the motor 48. Finally, to be able to turn the louvers 1 in the closed condition about the upper axis, a profiled shaft 106 (FIG. 8) is provided which passes through the hexagonal openings 68 of the worms 64 of all the lower sliders 56. It too is coupled to an appropriate motor (not shown) to enable automatic forced control of the louver movement.

The mode of operation of the louver curtain may be as follows:

In the opened condition, all the louvers 1 are in a package next to a lateral window edge. Here the flat sides 2 of the louvers 1 lie immediately against each other. For purposes of this operating sequence, it is assumed that the louvers 1 are positioned next to the window edge 42, i.e. the narrowest end of the window 38 as depicted in FIGS. 4 and 5.

During closing of the louver curtain the louvers are pulled lengthwise along the window in the manner described below. Band 79 is pulled over the free lying part of the lower guide track 47, while the coupling band 77 between the individual louvers 1 forms a loop which extends upwardly.

To close the louver curtain starting from this starting position, the motor 48 is switched on by means of an appropriate switch (not shown). This sets in motion the threaded spindles 104, 105, synchronously, by means of corresponding bendable shafts which run through tubes 49, 51. Both threaded spindles 104, 105 have the same thread pitch so that the driven slider 92 moves at the same speed along the upper guide track 46 as the lower slider 56. Thus, the louver 1 which is located between these two sliders is moved from the window edge 42 in the direction toward the window edge 39. In the process, both ends move at the same speed.

When the louver 1 which is thus driven has been moved over a corresponding distance, the loop of the coupling band 77, which is present between this louver 1 and the next louver 1, is pulled out. The coupling band 77 becomes effective and it begins to move the next louver with the leading louver 1. The same process takes place in the area of the upper guide track 46 on the coupling band which is present there, but has not been shown to simplify the representation.

The process of pulling out the loop between adjacent louvers 1 in the coupling band 77, as indicated above, continues from louver to louver so that an increasingly large number of louvers move in the direction toward the window edge 39.

After a corresponding time, the driven sliders 56, 92 have been advanced by screwing along the associated threaded spindles 104, 105 into their other final position. This position is reached, when the driven louver 1 reaches the window edge 39. Its arrival can be monitored automatically with the aid of end switches in order to automatically stop the drive motor 48 at time so the mechanical parts are not damaged.

To the extent that the coupling band 77 has spread over the guide track 47, the other cover band 79 was wound onto a corresponding spring shaft at 81. The guide track 47 is covered by the stretched coupling band 77, which is drawn flat over the top side of the guide track 47.

As the louvers move from their starting position to their final position, they automatically adapt themselves to the separation between the two guide tracks 46 and 47 by reason of the broad connection between the upper and lower louver parts 8, 7.

The user can then start the profile shaft 106 by switching on an additional drive motor which is not shown. As a result, all the worms 64 for the sliders 56 are driven synchronously. Via the angular gearing 63 and the entrainer shaft 73, the louvers are accordingly rotated about the upper immobile peg 101. The louvers can thus be brought in the position according to FIGS. 4 and 6. However, any desired intermediate rotated position is also possible.

If the user wishes to reopen the louver curtain 35, a verification is first carried out through a central control to determine the rotated position of the louvers 1. Since the worm drives are self locking, an opening of the louver curtain 35 could lead to damage if the narrow sides of the louvers bump against each other. A central control will therefore first ensure that the louvers 1 starts with the louvers in their transverse position in which their flat sides 2 are located in planes which are perpendicular to the plane of the window 38. The time when the final position is reached is again monitored by an end switch so that the profile shaft 106 can be stopped at the right time.

The threaded spindles 104, 105 again then are driven by the drive motor 48 but in the opposite direction of rotation. Because of their rotation, the sliders 56, 92 which have threaded bores 75, 98 are advanced by screwing in the direction toward the starting position. During opening movement, they gradually entrain and move the louvers located between them to their starting position. The coupling band 77 orients itself between adjacent louvers, individually to form a loop, and the cover band 79 is pulled behind. The profile shaft 106 remains at rest and on it the worms 64, which are located in the sliders 56, slide unimpeded in the longitudinal direction.

When the louvers 1, during the closing of the curtain 35, run from the shorter window edge to the longer lateral window edge, it must be ensured that the length of the upper louver part 8 does not prevent a corresponding shortening of the louver 1. When all the louvers 1 are equipped with such an upper louver part 8 of the same length, the course of the lower edges 13, which can be seen in FIG. 4, follows the course of the upper guide track 46. If this course is considered to be interfering, and the installation conditions allow it, the louvers 1 also can be parked next to the longer lateral window edge, that is, for example, next to the window edge 39 in the embodiment according to FIG. 6.

The upper louver parts 8 in this instance have length such that their lower edges 13 form, when the louver curtain 35 is closed, a straight line or a line which is parallel to the window edge 41, as can be seen in FIG. 6. The louver curtain 35, as viewed in FIG. 6, is opened from the side of the edge 42 and it is located, in the opened condition, next to the window edge 39. The louvers 1, in their travel, are stretched in the rest or parked position, when the louver curtain 35 is opened, in accordance with the increasing separation of the two guide tracks 46, 47. The lower edges 13 of the louver upper parts 8 present a different separation from the lower guide track 47, or the lower window elbow space, only in the opened position of the louver curtain 35. Such a course, under some circumstances, is considered to be less interfering because this line of the lower edges 13, which runs diagonally with respect to the lower edge, does not extend over the entire window width but only over a short section.

From the foregoing, it can be seen that a louver according to the invention consists of two parts which can be moved with respect to each other in the manner of a telescope. By means of a rubber traction system, the louver parts are subjected to pre-tension in the direction toward the shortened position of the louver. A louver curtain according to the invention consists of a multitude of louvers with automatically changeable lengths in which the louvers are guided at their two ends on guide tracks. The connection between the louver and each guide track is effected by sliders with the sliders at one end of the louvers being provided with a drive to change the angular position of the louvers. In addition, those sliders which travel the largest distance during opening and closing of the curtain are provided with spindle screw drives.

What is claimed is:

1. A louver (1) for a louver curtain (35) on a vehicle window (38) having a shape which differs from a rectangle comprising a first longitudinal louver part (7) having a longitudinal length greater than its transverse width, said first longitudinal louver part (7) having one end (18) which forms one end of the louver (1) and is provided with a connection device (19), a second louver part (8) connected to the first louver part in a manner that allows relative movement of the first and second louver parts (7, 8) with respect to each other in a direction parallel to the longitudinal length of the first louver part (7) for changing the longitudinal length of the louver without changing the length of the individual first and second louver parts, said second louver part (8) having one end (14) which forms a second end of the louver (1), and a pre-tension device (24) operative between said first and second louver parts (7, 8), for imparting between the two louver parts (7, 8) a pre-tension force in a direction parallel to the longitudinal length of the first louver part (7).

2. The louver of claim 1 in which said first louver part (7) has an I-shaped cross-sectional profile in at least a section of its length.

3. The louver of claim 1 in which said connection device defines catch members.

4. The louver of claim 1 in which an end (13) of the second louver part (8) opposite the end which forms the second end of said louver is shaped to abut an end section (18) of the first louver part (7) which defines the first end of said louver.

5. The louver of claim 1 in which said ends (5, 6) of the louver (1) are adapted to conform to the contour of the window (38) at each place where the louver is located.

6. The louver of claim 1 in which at least one end (6) of the louver (1) has a straight transverse profile.

7. The louver of claim 1 in which at least one end of the louver (1) has a curved profile when viewed from a side (2) of the louver (1).

8. The louver of claim 1 in which one of the louver parts (8) define a hollow space within which said pre-tension device (24) is housed.

9. The louver of claim 8 in which said hollow space is defined within the second louver part (8).

10. The louver of claim 9 in which said hollow space is closed by a cover (25).

11. The louver of claim 10 in which said cover (25) forms at least part of one end (5) of the louver (1).

12. The louver of claim 1 in which said second louver part (8) comprises a tube shaped section on which a cover (25) is positioned.

13. The louver of claim 14 in which said cover (25) is locked to said tube-shaped section.

14. The louver of claim 10 in which said cover (25) includes a support (29) for the pre-tension device.

15. The louver of claim 14 in which said first louver part has an end inserted within the second louver part (8) and which has a support (23) for the pre-tension device.

16. The louver of claim 15 in which said pre-tension device support (23) of said first louver part is defined by a pin (23, 29) mounted on the first louver part (7).

17. The louver of claim 1 in which said pre-tension device (24) biases the first and second louver parts in a direction which shortens the longitudinal length of the louver.

18. The louver of claim 1 in which the pre-tension device (24) includes a rubber ring.

19. The louver of claim 1 in which one end of said louver is formed with a keyhole shaped opening (31) for facilitating installation of the louver.

20. The louver of claim 1 in which said louver has an ellipsoid-shaped transverse cross section.

21. The louver of claim 1 in which a cross section of the louver (1) tapers to a tip at one end and is blunt at the other end, as viewed in a transverse plane perpendicular to the longitudinal length of the louver.

22. A louver blind curtain (35) for a vehicle window (38) having a shape which differs from a rectangle, comprising:
a plurality of two guide tracks (46, 47) which run along respective edges of the window,
louvers (1) which are guided between the guide tracks (46, 47) and which can be changed in their length in a direction at an angle to the guide tracks (46,47) when the louvers are being guided,
a drive device (56, 92, 104, 105) connected with at least one of the louvers (1) to move the louvers (1) along the guide tracks (46, 47),
a coupling device (77) which connects a louver (1) with at least one other louver (1), and
a rotation device (63, 106) for regulating an angular position of the louvers.

23. The louver blind curtain of claim 22 in which said louvers each comprise first and second louver parts (7, 8) that are movable relative to each other to change the length of the louver.

24. The louver blind curtain of claim 22 in which said louvers each include first and second longitudinal louver parts (7, 8) which are longitudinally movable relative to each other as an incident to movement along the guide tracks (46,47).

25. The louver blind curtain of claim 24 in which said first louver part (7) has an I-shaped cross-sectional profile in at least a section of its length.

26. The louver blind curtain of claim 24 in which said second louver part (18) has a tubular shape within which said first louver part can be moved with telescopic-like movement.

27. The louver blind curtain of claim 24 in which ends (5, 6) of the louver (1) are adapted to conform to the contour of the window (38) at each place where the louver is located.

28. The louver blind curtain of claim 25 in which one end of each louver (1) has a curved profile when viewed from a side (2) the of louver (1).

29. The louver blind curtain of claim 22 in which each louver has a pre-tension device housed within an interior of the louver.

30. The louver blind curtain of claim 29 in which each louver (1) comprises first and second relatively moveable longitudinal louver parts, and said pre-tension device (24) biases the first and second louver parts in a direction which shortens a longitudinal length of the louver.

31. The louver blind curtain of claim 30 in which the pre-tension device (24) includes a rubber ring.

32. The louver blind curtain of claim 22 in which said louvers (1) each have a slider (56, 92) at opposite ends which are movable with said louvers in said guide tracks (46, 47).

33. The louver blind curtain of claim 32 in which said sliders (56, 92) each have a projection (72, 101) engageably received within an opening (19, 31) in a respective end of the louver (1).

34. The louver blind curtain of claim 33 in which said projections (72, 101) are releasably engageable with the louver openings (19, 31).

35. The louver blind curtain of claim 33 in which said projections include a spherical head (103).

36. The louver blind curtain of claim 33 in which at least one said projections 72 is in the shape of a hammer.

37. The louver blind curtain of claim 31 in which a slider for one of said sliders has a threaded bore (75, 98) which receives a drive screw for moving the slider.

38. The louver blind curtain of claim 33 in which the projection (72) of each of a group of said sliders (56) have an angular gearing (63) for engagement with a respective tooth wheel (64) having a profiled, non-circular opening (68) positioned over a similarly profiled shaft (106), said profiled opening (68) being co-axially oriented parallel to the movement of the louvers (1) along the guide tracks (46, 47).

39. The louver blind curtain of claim 38 in which at least one of said guide tracks (46, 47) has a bendable shaft (106) with a profiled non-circular cross section upon which the tooth wheels (64) and the angular gearing (63) are relatively movable.

40. The louver blind curtain of claim 22 in which said guide tracks (46, 47) each have an associated flexible threaded spindle (104, 105) which is directed through a threaded bore (75, 98) of a respective slider (56, 92) of the louver which travels the longest path during opening or closing of the curtain.

41. The louver blind curtain of claim 22 including a pulling device (77) between the louvers (1) which includes at least one band having holes (78) distributed at equal distant separation corresponding to the separation of the louvers (1) in an closed position, and said louvers (1) each having a projection (72, 101) which pass through a respective hole in the band.

42. The louver blind curtain of claim 41 in which the band (77) covers the guide track (47) and closes an outwardly facing side of the guide track.

43. A louver (1) for a louver curtain (35) on a vehicle window (38) having a shape which differs from a rectangle comprising a first longitudinal louver part (7) having a longitudinal length greater than its transverse width, said first longitudinal louver part (7) having one end (18) which forms one end of the louver (1) and is provided with a connection device (19), a second louver part (8) connected to the first louver part and having a tubular shape within which said first louver part (7) is telescopically moveable in a direction parallel to the longitudinal length of the first louver part (7) for changing the longitudinal length of the louver, said second louver part (8) having one end (14) which forms a second end of the louver (1), and a pre-tension device (24) operative between said first and second louver parts (7, 8), for imparting between the two louver parts (7, 8) a pre-tension force in a direction parallel to the longitudinal length of the first louver part (7).

44. A louver (1) for a louver curtain (35) on a vehicle window (38) having a shape which differs from a rectangle comprising a first longitudinal louver part (7) having a longitudinal length greater than its transverse width, said first longitudinal louver part (7) having one end (18) which forms one end of the louver (1) and is provided with a connection device (19), a second louver part (8) connected to the first louver part in a manner that allows relative shifting movement of the first and second louver parts (7, 8) in a direction parallel to the longitudinal length of the first louver part (7), said second louver part (8) having one end (14) which forms a second end of the louver (1), and a pre-tension device (24) housed within an interior of the louver and operative between said first and second louver parts (7, 8) for imparting between the two louver parts (7, 8) a pre-tension force in a direction parallel to the longitudinal length of the first louver part (7).

* * * * *